(12) United States Patent
Lynch

(10) Patent No.: US 10,391,987 B2
(45) Date of Patent: Aug. 27, 2019

(54) METHOD FOR CONTROLLING A VEHICLE

(71) Applicant: TRW AUTOMOTIVE US LLC, Livonia, MI (US)

(72) Inventor: Gregory O Lynch, Southfield, MI (US)

(73) Assignee: TRW AUTOMOTIVES U.S. LLC, Livonia, MI (US)

( * ) Notice: Subject to any disclaimer, the term of this patent is extended or adjusted under 35 U.S.C. 154(b) by 0 days.

(21) Appl. No.: 15/604,046

(22) Filed: May 24, 2017

(65) Prior Publication Data

US 2018/0339686 A1 Nov. 29, 2018

(51) Int. Cl.

| | | |
|---|---|---|
| G05D 1/00 | (2006.01) | |
| G06F 7/00 | (2006.01) | |
| G06F 17/00 | (2019.01) | |
| B60T 8/1755 | (2006.01) | |
| B60T 7/12 | (2006.01) | |
| B60T 8/171 | (2006.01) | |
| B60T 8/172 | (2006.01) | |
| B60T 8/24 | (2006.01) | |
| B60T 8/26 | (2006.01) | |
| B60T 8/34 | (2006.01) | |
| G01C 21/00 | (2006.01) | |
| G06F 7/70 | (2006.01) | |
| G06F 19/00 | (2018.01) | |
| G06G 7/76 | (2006.01) | |

(Continued)

(52) U.S. Cl.
CPC .......... *B60T 8/17551* (2013.01); *B60T 7/12* (2013.01); *B60T 8/171* (2013.01); *B60T 8/172* (2013.01); *B60T 8/17555* (2013.01); *B60T 8/246* (2013.01); *B60T 8/26* (2013.01); *B60T 8/34* (2013.01); *B60T 2201/122* (2013.01); *B60T 2201/16* (2013.01); *B60T 2210/20* (2013.01); *B60T 2210/36* (2013.01); *B60T 2230/02* (2013.01)

(58) Field of Classification Search
CPC ........ B60T 8/17551; B60T 7/12; B60T 8/171; B60T 8/172; B60T 8/246; B60T 8/26; B60T 8/34; B60T 8/1735; G06F 7/00; G06F 19/00; G01C 21/00; B60W 50/00
USPC .............................. 701/93, 205, 70, 300, 23
See application file for complete search history.

(56) References Cited

U.S. PATENT DOCUMENTS

2005/0021226 A1* 1/2005 Kustosch ........... G01C 21/3697
  701/466
2007/0282510 A1* 12/2007 Nimmo ................... B60T 8/243
  701/70

(Continued)

FOREIGN PATENT DOCUMENTS

EP 2366595 9/2011
WO 03024758 3/2003

(Continued)

*Primary Examiner* — Mahmoud S Ismail
(74) *Attorney, Agent, or Firm* — Tarolli, Sundheim, Covell & Tummino LLP

(57) ABSTRACT

A method of controlling a vehicle including providing a system having a plurality of brakes and a curve detecting mechanism. Each brake of the plurality of brakes is configured to slow rotation of a respective wheel. The method further includes detecting a curve in a forward travel path of the vehicle using the curve detecting mechanism. At least two brakes but fewer than all of the plurality of brakes are pre-filled in response to the detection of a curve.

20 Claims, 3 Drawing Sheets

(51) Int. Cl.
  *G06G 7/00* (2006.01)
  *G05D 1/02* (2006.01)
  *G06F 17/10* (2006.01)
  *G06G 7/78* (2006.01)
  *G01C 22/00* (2006.01)

(56) References Cited

U.S. PATENT DOCUMENTS

| | | | | |
|---|---|---|---|---|
| 2008/0001476 | A1* | 1/2008 | Franzke | B60T 7/108 303/177 |
| 2008/0262686 | A1* | 10/2008 | Kieren | B60T 8/17554 701/70 |
| 2009/0299578 | A1* | 12/2009 | Lucas | B60R 21/013 701/46 |
| 2009/0299630 | A1* | 12/2009 | Denaro | B60W 30/18009 701/300 |
| 2015/0100189 | A1* | 4/2015 | Tellis | B60T 7/18 701/23 |

FOREIGN PATENT DOCUMENTS

| | | |
|---|---|---|
| WO | 03064226 | 8/2003 |
| WO | 2006045826 | 5/2006 |

\* cited by examiner

METHOD FOR CONTROLLING A VEHICLE

TECHNICAL FIELD

The present invention relates to a vehicle and, more specifically, to a method for controlling a vehicle.

BACKGROUND

Vehicle production companies strive to improve the safety of vehicle occupants. Various systems have been developed to improve vehicle safety. As an example, brake pre-fill has been used in conjunction with collision avoidance and collision mitigation systems to decrease response time associated with emergency braking when a collision situation arises. As another example, electronic stability control has been provided to maintain vehicle control by correcting vehicle understeer, vehicle oversteer, or other vehicle instability conditions.

SUMMARY

In one aspect of the present invention, a method of controlling a vehicle is disclosed including providing a system having a plurality of brakes and a curve detecting mechanism. Each brake of the plurality of brakes is configured to slow rotation of a respective wheel. The method further includes detecting a curve in a forward travel path of the vehicle using the curve detecting mechanism. At least two brakes but fewer than all of the plurality of brakes are pre-filled in response to the detection of a curve.

BRIEF DESCRIPTION OF THE DRAWINGS

For a better understanding, reference may be made to the accompanying drawings, in which.

DESCRIPTION OF ASPECTS OF THE INVENTION

Figure 1:
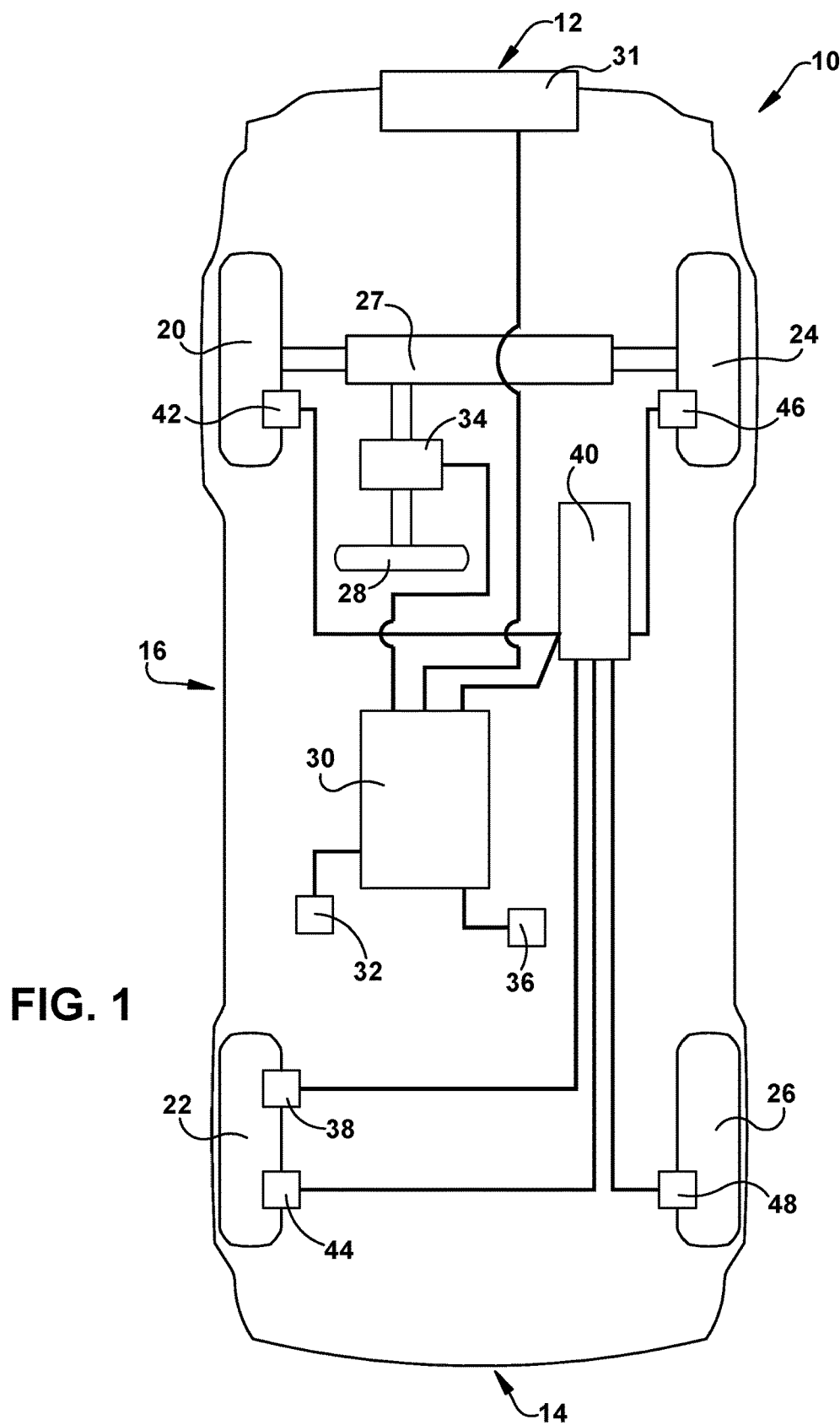
FIG. 1 is a schematic view of a vehicle.

Referring to FIG. 1, a vehicle 10 is shown. The vehicle 10 includes a front side 12, a rear side 14, a left side 16, and a right side 18. As used in this specification, the front side 12 refers to the side of the vehicle 10 that leads when the vehicle 10 is traveling in a forward gear and the rear side 14 refers to the side of the vehicle 10 that leads when the vehicle 10 is traveling in a reverse gear. The left side 16 and the right side 18 are defined with respect to an occupant that is seated in the vehicle 10 facing the front side 12.

The vehicle 10 is provided with a front left wheel 20, a rear left wheel 22, a front right wheel 24, and a rear right wheel 26. Although the vehicle 10 depicted in FIG. 1 includes only four wheels 20, 22, 24, 26, it is contemplated that the vehicle 10 can be provided with more than four wheels (e.g., semi-trailer tractor truck). The front left wheel 20 and the front right wheel 24 can be turned by a steering mechanism 27, thereby controlling the direction of travel of the vehicle 10. The steering mechanism 27 can be controlled by a vehicle occupant via a steering member 28. It is contemplated that the rear left wheel 22 and the rear right wheel 26 can be turned to control the direction of travel of the vehicle 10.

A front left brake 42, a rear left brake 44, a front right brake 46, and a rear right brake 48 are provided for slowing rotation of the front left wheel 20, the rear left wheel 22, the front right wheel 24, and the rear right wheel 26, respectively. A brake controller 40 is provided for actuating the brakes 42, 44, 46, 48. The brake controller 40 actuates the brakes 42, 44, 46, 48 via hydraulic lines 49. It is contemplated that the brake controller 40 can actuate the brakes 42, 44, 46, 48 via electronic communication (i.e., brake-by-wire) or any other suitable arrangement.

The vehicle 10 includes a processing unit 30 for monitoring vehicle components, vehicle inputs, and/or vehicle operating conditions, etc. It is contemplated that the processing unit 30 can be omitted and the controller 40 configured to monitor vehicle components, vehicle inputs, and/or vehicle operating conditions, etc. The processing unit 30 is in communication with a curve detecting mechanism 31. It is contemplated that the curve detecting mechanism 31 can be in direct communication with the brake controller 40 rather than being in communication with the brake controller via the processing unit 30. The curve detecting mechanism 31 is configured to detect the presence of curves in a roadway in front of the vehicle 10 when the vehicle 10 is traveling forward. In addition to detecting the presence of curves, the curve detecting mechanism 31 can also determine the direction of a detected curve relative to forward travel of the vehicle 10 (i.e., left hand curve or right hand curve) and/or the rate of change of a detected curve (i.e., how "sharp" a curve is). The curve detecting mechanism 31 can include a camera, lidar, radar, global positioning system 32, or any other suitable apparatus that can detect curves in a roadway.

Various other sensors are in communication with the processing unit 30 to provide further information relating to the vehicle 10. For example, a steering input sensor 34 detects steering inputs made by the vehicle operator into the steering member 28. A yaw rate sensor 36 detects the angular velocity of the vehicle 10 around a vertical axis. A wheel speed sensor 38 detects the rotational speed of the rear left wheel 22. The wheel speed sensor 38 can be in direct communication with the brake controller 40. The rotational speed of the wheel can be used to calculate the speed of the vehicle 10. Thus, detecting the rotational speed of the wheel effectively senses the vehicle speed. It is contemplated that the wheel speed sensor 38 can be arranged to detect the rotational speed of one of the other wheels 20, 24, 26. It is also contemplated that additional wheel speed sensors (i.e., two or more wheel speed sensors) can be provided to detect the rotational speed of the other wheels 20, 24, 26. Furthermore, it is contemplated that additional sensors beyond the ones specifically enumerated can be in communication with the processing unit 30 to provide even further information relating to the vehicle 10 (e.g., sensors arranged to detect lateral acceleration of the vehicle 10).

Table 1, provided below, illustrates a brake pre-fill strategy for curve negotiation assistance that can be performed by the vehicle 10 of FIG. 1. As known by those skilled in the automotive brake art, brake pre-fill refers to automatically filling the brake hydraulics with fluid prior to actual application of the brakes, thereby bringing the brake pads closer to, but not in contact with, the brake disc. As understood by those skilled in the automotive brake art, brake pre-filling improves the response time of brake application. The brakes 42, 44, 46, 48 that are pre-filled in response to a particular curve direction are marked with an "X".

TABLE 1

| | | Brake Location | | | |
|---|---|---|---|---|---|
| | | Front Left | Front Right | Rear Left | Rear Right |
| Curve Direction | Left | X | | X | |
| | Right | | X | | X |

As shown in Table 1, if the curve detecting mechanism 31 detects a curve in the roadway that turns to the left relative to a forward direction of vehicle travel, the processing unit 30 directs the brake controller 40 to pre-fill the front left brake 42 and the rear left brake 44. The front right brake 46 and the rear right brake 48 are not pre-filled. If the curve detecting mechanism 31 detects a curve in the roadway that turns to the right relative to a forward direction of vehicle travel, the processing unit 30 directs the brake controller 40 to pre-fill the front right brake 46 and the rear right brake 48. The front left brake 42 and the rear left brake 44 are not pre-filled. It is contemplated that the curve detecting mechanism 31, rather than the processing unit 30, can be provided with hardware that enables the curve detecting mechanism 31 to direct the brake controller 40 to perform specific pre-fill strategies.

Figure 2:
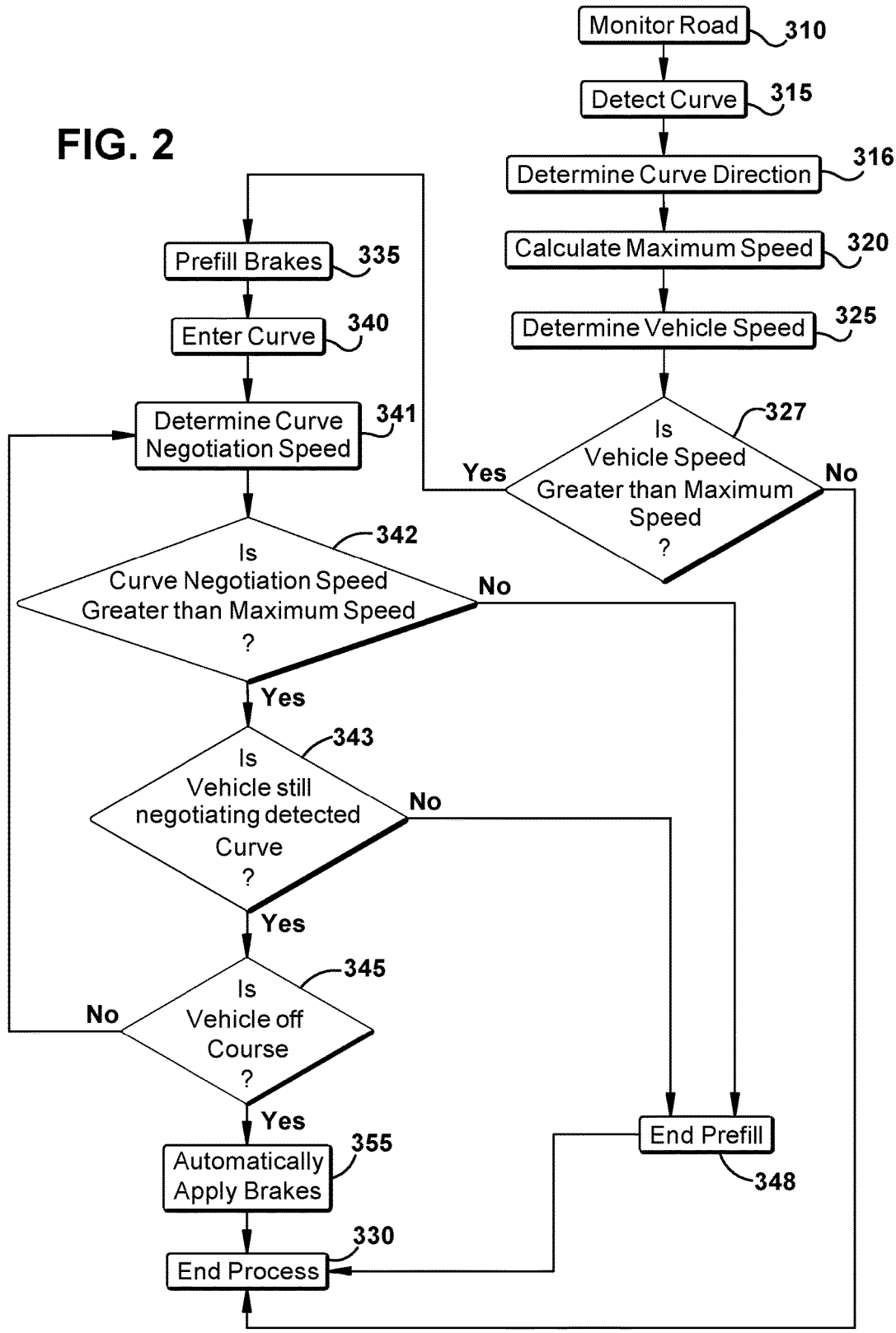
FIG. 2 is a flow chart depicting a method of operating a braking system of the vehicle of FIG. 1.

Referring to FIG. 2, an example process of executing a brake-fill strategy for curve negotiation assistance is illustrated. At 310, the curve detecting mechanism 31 monitors the roadway for a curve. At 315, a curve is detected in the roadway by the curve detecting mechanism 31. It is contemplated that the vehicle 10 can additionally, or alternatively, detect the presence of a curve through information provided by other vehicle sensors/systems (e.g., GPS 32). At 316 the curve detecting mechanism 31 determines the curve direction. At 320, the processing unit 30 calculates a maximum speed for safely traversing the detected curve. The calculation can be based on the rate of change of the curve. It is contemplated that the calculation can additionally, or alternatively, be based on information provided by the vehicle sensors and/or any other variable that can affect vehicle handling characteristics. Furthermore, it is contemplated that the curve detecting mechanism 31 can be configured to calculate the maximum speed for safely traversing the detected curve.

At 325, the vehicle speed is determined. At 327, a determination is made as to whether the vehicle speed is greater than the calculated maxium speed. If the vehicle speed is not greater than the calculated maximum speed, the process ends at 330 and the curve is traversed without further automated action from the vehicle 10.

If the vehicle speed is greater than the calculated maximum speed, the process moves to 335 and the appropriate brakes are pre-filled as set forth in Table 1. The vehicle 10 can be arranged to pre-fill the appropriate brakes at a predetermined distance before the vehicle 10 enters the curve (e.g., pre-fill occurs when the vehicle 10 is 25 meters away from the detected curve). The vehicle 10 can alternatively, or additionally, be arranged to pre-fill the appropriate brakes a predetermined time period before the vehicle 10 enters the curve (e.g., pre-fill occurs when the vehicle 10 is 15 seconds away from entering the curve). Furthermore, the vehicle 10 can alternatively, or additionally, be arranged to pre-fill the appropriate brakes as soon as it is determined that the vehicle speed is greater than the calculated maximum speed.

At 340, the vehicle 10 enters the curve. At 341, the vehicle speed during curve negotiation is determined. At 342, a determination is made as to whether the vehicle speed during curve negotiation is greater than the calculated maximum speed. If the vehicle speed during curve negotiation is not greater than the calculated maximum speed, the pre-fill is ended at 348. Ending the pre-fill can involve emptying the brake hydraulics of the fluid associated with the pre-fill process. The process subsequently ends at 330.

If the vehicle speed during curve negotiation is greater than the calculated maximum speed, the process moves to 343 and a determination is made as to whether the vehicle 10 is still negotiating the curve. If the vehicle 10 is not still negotiating the curve, the pre-fill is ended at 348 and the process subsequently ends at 330. If the vehicle is still negotiating the curve the process moves to 345 and a determination is made as to whether the vehicle is off course of the detected curve. If the vehicle is not off course, the process returns to 341 to make a determination as to whether the vehicle speed during curve negotiation is greater than the calculated maximum speed. If the vehicle is off course, the process moves to 355.

The vehicle being off course can mean that the vehicle 10 is traveling wide of the detected curve. For example, if the vehicle 10 is supposed to be traveling along a left hand curve, the vehicle 10 can go off course by traveling off the roadway along the curve on right side of the roadway. As another example, if the vehicle 10 is supposed to be traveling along a right hand curve, the vehicle 10 can go off course by traveling off the roadway along the curve on the left side of the roadway. The path of vehicle travel can be determined by the global positioning system 32, the steering input sensor 34, the yaw rate sensor 36, and/or any other suitable sensor/system. At 355 the pre-filled brakes are automatically applied as necessary to assist in bringing the vehicle 10 back on course. The process then ends at 330.

Pre-filling the brakes in the manor set forth in Table 1 improves the response time of brake application should it be determined that the brakes are needed for assisting the negotiation of a curve. For example, if it is determined that the vehicle 10 is off course of a detected left hand curve, the front left brake 42 and the rear left brake 44 can be applied to slow rotation of the wheels 20, 22 on the inside of the curve, thereby assisting in turning the vehicle 10 to the left and resisting travel of the vehicle 10 off the right side of the roadway. As another example, if it is determined that the vehicle is off course of a detected right hand curve, the front right brake 46 and the rear right brake 48 can be applied to slow rotation of the wheels 20, 22 on the inside of the curve, thereby assisting in turning the vehicle 10 to the right and resisting travel of the vehicle 10 off the left side of the roadway. Corrective action in response to the detection of an off course vehicle is provided more quickly due to the fact that the appropriate brakes needed to provide such corrective action are pre-filled.

It is contemplated that various aspects of the above described process of executing the brake-fill strategy for curve negotiation can be altered or omitted. For example, the vehicle 10 can be arranged to pre-fill the appropriate brakes regardless of whether the vehicle speed is greater than, less than, or equal to the calculated maximum speed. Additionally, it is contemplated that, if the vehicle 10 is arranged to pre-fill the appropriate brakes regardless of the vehicle speed, it may be unnecessary to calculate a maximum speed. As another example, the brakes can remain pre-filled regardless of whether the vehicle speed during curve negotiation is greater than the calculated maximum speed. As yet another example, the process can omit the automatic application of the pre-filled brakes, thereby relying on the operator's assessment of whether brake application is desired to assist in traversing the curve.

Table 2, provided below, illustrates a brake pre-fill strategy for maintaining vehicle stability during curve maneuvering that can be performed by the vehicle 10 of FIG. 1. The brakes that are pre-filled in response to a particular curve direction are marked with an "X".

TABLE 2

| | | Brake Location | | | |
|---|---|---|---|---|---|
| | | Front Left | Front Right | Rear Left | Rear Right |
| Curve Direction | Left | | X | X | |
| | Right | X | | | X |

As shown in Table 2, if the curve detecting mechanism 31 detects a curve in the roadway that turns to the left relative to a forward direction of vehicle travel, the processing unit 30 directs the brake controller 40 to pre-fill the front right brake 46 and the rear left brake 44. The front left brake 42 and the rear right brake 48 are not pre-filled. If the curve detecting mechanism 31 detects a curve in the roadway that turns to the right relative to a forward direction of vehicle travel, the processing unit 30 directs the brake controller 40 to pre-fill the front left brake 42 and the rear right brake 48. The front right brake 46 and the rear left brake 44 are not pre-filled. It is contemplated that the curve detecting mechanism 31, rather than the processing unit 30, can be provided with hardware that enables the curve detecting mechanism 31 to direct the brake controller 40 to perform specific pre-fill strategies.

Figure 3:
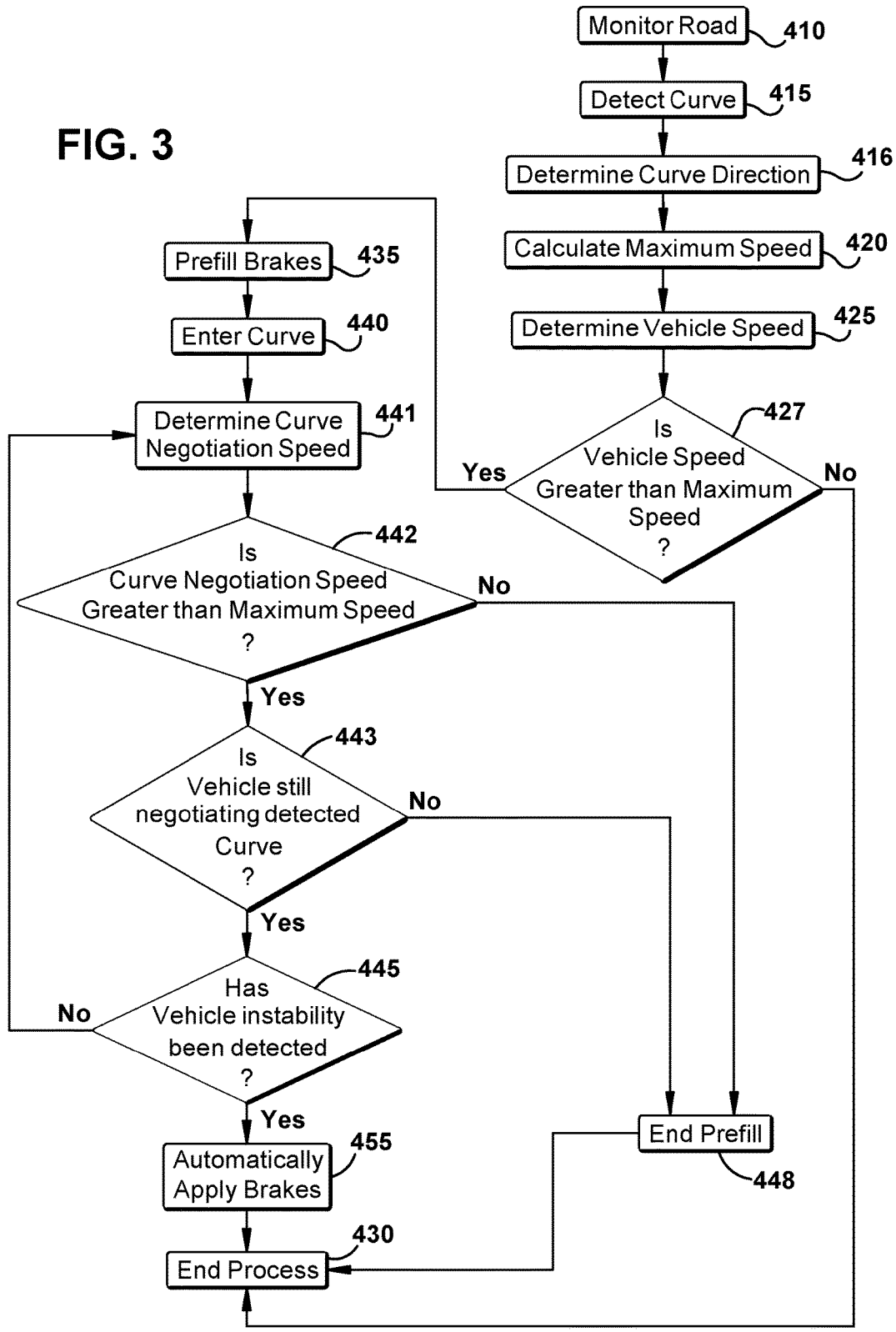
FIG. 3 is a flow chart depicting another method of operating a braking system of the vehicle of FIG. 1.

Referring to FIG. 3, an example process of executing the brake-fill strategy for maintaining vehicle stability during curve maneuvering is illustrated. At 410, the curve detecting mechanism 31 monitors the roadway for a curve. At 415, a curve is detected in the roadway by the curve detecting mechanism 31. It is contemplated that the vehicle 10 can additionally, or alternatively, detect the presence of a curve through information provided by other vehicle sensors/systems (e.g., GPS 32). At 416 the curve detecting mechanism 31 determines the curve direction. At 420, the processing unit 30 calculates a maximum speed for safely traversing the detected curve. The calculation can be based on the rate of change of the curve (i.e., how "sharp" the curve is). It is contemplated that the calculation can additionally, or alternatively, be based on information provided by the vehicle sensors and/or any other variable that can affect vehicle handling characteristics. Furthermore, it is contemplated that the curve detecting mechanism 31 can be configured to calculate the maximum speed for safely traversing the detected curve.

At 425, the vehicle speed is determined. At 427, a determination is made as to whether the vehicle speed is greater than the calculated maximum speed. If the vehicle speed is not greater than the calculated maximum speed, the process ends at 430 and the curve is traversed without further automated action from the vehicle 10.

If the vehicle speed is greater than the calculated maximum speed, the process moves to 435 and the appropriate brakes are pre-filled as set forth in Table 2. The vehicle 10 can be arranged to pre-fill the appropriate brakes at a predetermined distance before the vehicle 10 enters the detected curve (e.g., pre-fill occurs when the vehicle 10 is 25 meters away from the curve). The vehicle 10 can alternatively, or additionally, be arranged to pre-fill the appropriate brakes a predetermined time period before the vehicle 10 enters the curve (e.g., pre-fill occurs when the vehicle 10 is 15 seconds away from entering the curve). Furthermore, the vehicle 10 can alternatively, or additionally, be arranged to pre-fill the appropriate brakes as soon as it is determined that the vehicle speed is greater than the calculated maximum speed.

At 440, the vehicle 10 enters the curve. At 441, the vehicle speed during curve negotiation is determined. At 442, a determination is made as to whether the vehicle speed during curve negotiation is greater than the calculated maximum speed. If the vehicle speed during curve negotiation is not greater than the calculated maximum speed, the pre-fill is ended at 448. Ending the pre-fill can involve emptying the brake hydraulics of the fluid associated with the pre-fill process. The process subsequently ends at 430.

If the vehicle speed during curve negotiation is greater than the calculated maximum speed, the process moves to 443 and a determination is made as to whether the vehicle is still negotiating the curve. If the vehicle is not still negotiating the curve, the pre-fill is ended at 448 and the process subsequently ends at 430. If the vehicle is still negotiating the curve the process moves to 445 and a determination is made as to whether vehicle instability has been detected. If vehicle instability is not detected, the process returns to 441 to make a determination as to whether the vehicle speed during curve negotiation is greater than the calculated maximum speed. If the vehicle instability is detected (e.g., understeer or oversteer) the process moves to 455 and the pre-filled brakes are automatically applied at 455 as necessary to restore vehicle stability. The process then ends at 430.

Pre-filling the brakes in the manor set forth in Table 2 improves the response time of brake application should it be determined that the brakes are needed for maintaining vehicle stability during curve maneuvering. For example, during maneuvering of a left hand curve, vehicle oversteer can be corrected by the application of the front right brake 46 to slow the associated wheel. Additionally, during maneuvering of a left hand curve, vehicle understeer can be corrected by the application of the left rear brake 44 to slow the associated wheel. As another example, during maneuvering or a right hand curve, vehicle oversteer can be corrected by the application of the front left brake 42 to slow the associated wheel. Additionally, during maneuvering of a right hand curve, vehicle understeer can be corrected by the application of the right rear brake 48 to slow the associated wheel. Corrective action in response to the detection of vehicle instability (i.e., oversteer or understeer) is provided more quickly due to the fact that the appropriate brakes needed to provide such corrective action are already pre-filled.

It is appreciated that various aspects of the above described process of executing the brake-fill strategy for maintaining vehicle stability during curve maneuvering can be altered or omitted. For example, the vehicle 10 can be arranged to pre-fill the appropriate brakes regardless of whether the vehicle speed is greater than, less than, or equal to the calculated maximum speed. Additionally, it is contemplated that, if the vehicle 10 is arranged to pre-fill the appropriate brakes regardless of the vehicle speed, it may be unnecessary to calculate a maximum speed. As another example, the brakes can remain pre-filled regardless of whether the vehicle speed during curve negotiation is greater than the calculated maximum speed. As yet another example, the process can omit the automatic application of the pre-filled brakes, thereby relying on the driver's assessment of whether brake application is desired to assist in restoring vehicle stability.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the specification is intended to embrace all such alterations, modifications, and variations that fall within the scope of this application, including the appended claims.

I claim:

1. A method of controlling a vehicle comprising the steps of:
   providing a system having a plurality of brakes and a curve detecting mechanism, each brake of the plurality of brakes being configured to slow rotation of a respective vehicle wheel,
   detecting a curve in a forward travel path of the vehicle using the curve detecting mechanism,
   pre-filling at least two brakes but fewer than all of the plurality of brakes in response to the detection of a curve,
   calculating a maximum speed that the vehicle can safely traverse the detected curve,
   determining a speed of the vehicle; and
   wherein the step of pre-filling occurs only when the determined speed of the vehicle exceeds the calculated maximum speed.

2. The method of claim 1, wherein the step of pre-filling occurs when the vehicle is at a predetermined distance from the detected curve.

3. The method of claim 1, wherein the step of pre-filling occurs when the vehicle is at a predetermined time period of travel away from the detected curve.

4. The method of claim 1, wherein the curve detecting mechanism includes at least one of a camera, lidar, radar, and global positioning system.

5. The method of claim 1, wherein the vehicle includes a front left wheel, a rear left wheel, a front right wheel, and a rear right wheel.

6. The method of claim 5, wherein the step of pre-filling involves only pre-filling the brake of the front left wheel and the brake of the rear left wheel when a left hand curve is detected and only pre-filling the brake of the front right wheel and the brake of the rear right wheel when a right hand curve is detected.

7. The method of claim 6, further comprising the step of activating only the pre-filled brakes after the step of pre-filling.

8. The method of claim 5, wherein the step of pre-filling involves only pre-filling the brake of the front right wheel and the brake of the rear left wheel when a left hand curve is detected and only pre-filling the brake of the front left wheel and the brake of the rear right wheel when a right hand curve is detected.

9. The method of claim 8, further comprising the step of determining if the vehicle is oversteering or understeering as the vehicle is traversing the detected curve.

10. The method of claim 9, further comprising the step of braking only the front left wheel after the step of pre-filling if it is determined that the vehicle is oversteering and the vehicle is traversing a right hand curve.

11. The method of claim 9, further comprising the step of braking only the front right wheel after the step of pre-filling if it is determined that the vehicle is oversteering and the vehicle is traversing a left hand curve.

12. The method of claim 9, further comprising the step of braking only the rear left wheel after the step of pre-filling if it is determined that the vehicle is understeering the vehicle is traversing a left hand curve.

13. The method of claim 9, further comprising the step of braking only the rear right wheel after the step of pre-filling if it is determined that the vehicle is understeering and the vehicle is traversing a right hand curve.

14. The method of claim 1 comprising the step of determining a direction of the curve after detecting the curve.

15. The method of claim 1 comprising the steps of:
    determining the speed of the vehicle during curve negotiation; and
    ending the pre-fill of the at least two brakes but fewer than all of the plurality of brakes in response to the speed of the vehicle during curve negotiation being less than the calculated maximum speed.

16. A method of controlling a vehicle comprising the steps of:
    providing a system having a plurality of brakes and a curve detecting mechanism, each brake of the plurality of brakes being configured to slow rotation of a respective vehicle wheel,
    detecting a curve in a forward travel path of the vehicle using the curve detecting mechanism, and
    pre-filling at least two brakes but fewer than all of the plurality of brakes in response to the detection of a curve when the vehicle is at a predetermined time period of travel away from the detected curve.

17. The method of claim 16, wherein the step of pre-filling involves only pre-filling the brake of a front left wheel of the vehicle and the brake of a rear left wheel of the vehicle when a left hand curve is detected and only pre-filling the brake of a front right wheel of the vehicle and the brake of a rear right wheel of the vehicle when a right hand curve is detected.

18. The method of claim 17, further comprising the step of activating only the pre-filled brakes after the step of pre-filling.

19. The method of claim 16, wherein the step of pre-filling involves only pre-filling the brake of a front right wheel of the vehicle and the brake of a rear left wheel of the vehicle when a left hand curve is detected and only pre-filling the brake of a front left wheel of the vehicle and the brake of a rear right wheel of the vehicle when a right hand curve is detected.

20. The method of claim 19, further comprising determining if the vehicle is oversteering or understeering as the vehicle is traversing the detected curve, braking only the front left wheel after the step of pre-filling if it is determined that the vehicle is oversteering and the vehicle is traversing a right hand curve, braking only the front right wheel after the step of pre-filling if it is determined that the vehicle is oversteering and the vehicle is traversing a left hand curve, braking only the rear left wheel after the step of pre-filling if it is determined that the vehicle is understeering and the vehicle is traversing a left hand curve, braking only the rear right wheel after the step of pre-filling if it is determined that the vehicle is understeering and the vehicle is traversing a right hand curve.

* * * * *